| (12) | United States Patent | (10) Patent No.: | US 11,031,621 B2 |
|---|---|---|---|
| | Guen | (45) Date of Patent: | Jun. 8, 2021 |

(54) SECONDARY BATTERY HAVING POSITIVE ELECTRODE TERMINAL-AND-MEMBRANE INTEGRATED CAP PLATE

(71) Applicant: Samsung SDI Co., Ltd., Yongin-si (KR)

(72) Inventor: Min Hyung Guen, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 15/992,684

(22) Filed: May 30, 2018

(65) Prior Publication Data

US 2018/0358648 A1 Dec. 13, 2018

(30) Foreign Application Priority Data

Jun. 13, 2017 (KR) .................. 10-2017-0073807

(51) Int. Cl.
*H01M 10/052* (2010.01)
*H01M 4/46* (2006.01)
(Continued)

(52) U.S. Cl.
CPC ......... *H01M 10/052* (2013.01); *H01M 4/463* (2013.01); *H01M 4/662* (2013.01);
(Continued)

(58) Field of Classification Search
CPC .......... H01M 2/345; H01M 2/06; H01M 2/26; H01M 2/30; H01M 2200/103; H01M 2200/20
See application file for complete search history.

(56) References Cited

U.S. PATENT DOCUMENTS

| 10,026,948 B2 | 7/2018 | Kohlberger |
| 10,181,596 B2 | 1/2019 | Yamawaki et al. |
| (Continued) | | |

FOREIGN PATENT DOCUMENTS

| CN | 104051702 A | 9/2014 |
| CN | 106374059 A | 2/2017 |
| (Continued) | | |

OTHER PUBLICATIONS

EPO Partial Search Report dated Aug. 17, 2018, for corresponding European Patent Application No. 18176699.9 (13 pages).
(Continued)

*Primary Examiner* — Ula C Ruddock
*Assistant Examiner* — Thomas H. Parsons
(74) *Attorney, Agent, or Firm* — Lewis Roca Rothgerber Christie LLP

(57) ABSTRACT

Various examples provide a secondary battery having a positive electrode terminal-and-membrane integrated cap plate, which can cut off a charging current in an overcharge mode by integrating a positive electrode terminal and a membrane into the cap plate, and can cut off a short-circuit current in an external short-circuit mode by placing a fuse in a region of the membrane connected to the current collector plate. In one example embodiment, the secondary battery may include a case having an opening, an electrode assembly housed in the opening of the case housed in the opening of the case, and a cap plate coupled to the opening of the case, wherein the cap plate may include a terminal portion integrated into the cap plate, and a membrane integrated into the terminal portion to be electrically connected to the electrode assembly.

12 Claims, 10 Drawing Sheets

(51) Int. Cl.
*H01M 4/66* (2006.01)
*H01M 50/155* (2021.01)
*H01M 50/172* (2021.01)
*H01M 50/409* (2021.01)
*H01M 50/531* (2021.01)
*H01M 50/543* (2021.01)
*H01M 50/578* (2021.01)
*H01M 4/02* (2006.01)

(52) U.S. Cl.
CPC ....... *H01M 50/155* (2021.01); *H01M 50/172* (2021.01); *H01M 50/409* (2021.01); *H01M 50/531* (2021.01); *H01M 50/543* (2021.01); *H01M 50/578* (2021.01); *H01M 2004/027* (2013.01); *H01M 2004/028* (2013.01); *H01M 2200/103* (2013.01); *H01M 2200/20* (2013.01)

(56) References Cited

U.S. PATENT DOCUMENTS

| | | | |
|---|---|---|---|
| 10,439,195 B2 * | 10/2019 | Hirose | H01M 2/26 |
| 2014/0272491 A1 * | 9/2014 | Kohlberger | H01M 2/0285 429/61 |
| 2016/0268077 A1 * | 9/2016 | Hirose | H01G 11/16 |
| 2017/0062866 A1 | 3/2017 | Umeyama et al. | |

FOREIGN PATENT DOCUMENTS

| | | | |
|---|---|---|---|
| CN | 106450120 A | | 2/2017 |
| JP | H0714558 U | | 3/1995 |
| JP | 2014096225 | * | 5/2014 |
| JP | 2014096225 A | * | 5/2014 |
| JP | 2014096225 A | | 5/2014 |
| KR | 10-1254871 B1 | | 4/2013 |
| KR | 10-2016-0060222 A | | 5/2016 |
| KR | 10-1651988 B1 | | 8/2016 |

OTHER PUBLICATIONS

Extended European Search Report dated Nov. 30, 2018 for corresponding European Application No. 18176699.9, 13 pages.
Chinese Office Action, with English translation, dated Nov. 4, 2020, issued in corresponding Chinese Patent Application No. 201810579411.9 (15 pages).

* cited by examiner

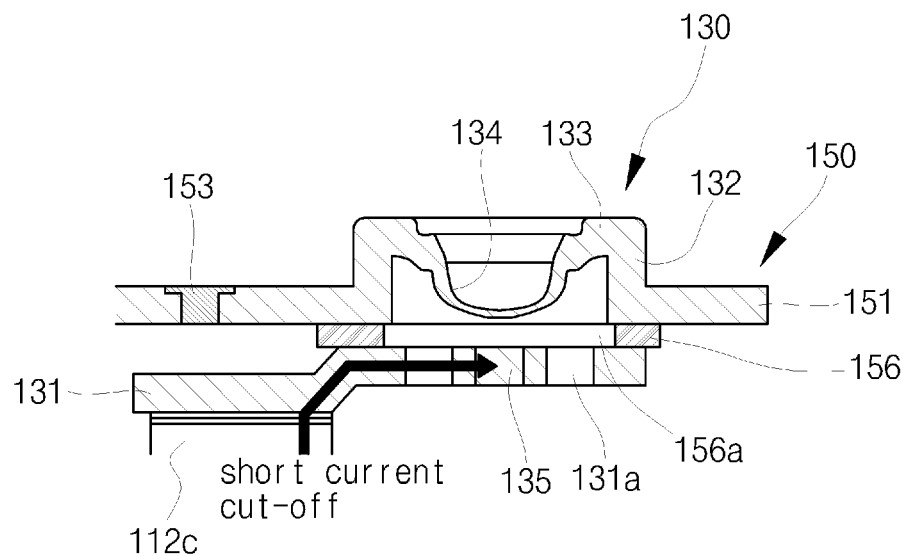

SECONDARY BATTERY HAVING POSITIVE ELECTRODE TERMINAL-AND-MEMBRANE INTEGRATED CAP PLATE

CROSS-REFERENCE TO RELATED APPLICATION

This application claims priority to and the benefit of Korean Patent Application No. 10-2017-0073807, filed on Jun. 13, 2017 in the Korean Intellectual Property Office, the entire content of which is herein incorporated by reference.

BACKGROUND

1. Field

Various examples of the present disclosure relate to a secondary battery having a positive electrode terminal-and-membrane integrated cap plate.

2. Description of the Related Art

A secondary battery is a power storage system which can provide an excellent energy density for converting electrical energy into chemical energy and storing the same. Unlike primary batteries, which cannot be recharged, secondary batteries are rechargeable and are widely used in information technology (IT) devices, such as smart phones, cellular phones, notebook computers, tablet personal computers (tablet PCs), or the like. Recently, in order to reduce environmental pollution, electric vehicles have attracted high attention, and high-capacity secondary batteries are employed to power the electric vehicles. Accordingly, the development of secondary batteries having characteristics including high energy density, high power output, and stability, is desired.

The above information disclosed in this section is only for enhancement of understanding of the background of the described technology and therefore it may contain information that does not form the prior art.

SUMMARY

Various examples of the present disclosure provide a secondary battery having a positive electrode terminal-and-membrane integrated cap plate. In some examples, the present disclosure provide a secondary battery having a positive electrode terminal-and-membrane integrated cap plate, which can cut off a charging current in an overcharge mode by integrating a positive electrode terminal and a membrane into the cap plate, and can also cut off a short-circuit current in an external short-circuit mode by placing a fuse in a region of the membrane connected to the current collector plate.

In some example of the present disclosure, there is provided a secondary battery including a case having an opening, an electrode assembly housed in the opening of the case, and a cap plate covering the opening of the case, wherein the cap plate may include a terminal portion integrated into the cap plate, and a membrane integrated into the terminal portion to be electrically connected to the electrode assembly.

The terminal portion may include a support region extending vertically upwards from the cap plate, and a terminal region extending horizontally from the support region, wherein the membrane may be concavely located downwardly from the terminal region. A thickness of the membrane may be smaller than that of the terminal region. The membrane may be connected to the electrode assembly through a current collector plate. A lower insulation plate may be interposed between the cap plate and the current collector plate. A terminal cavity may be defined by the terminal portion and the membrane, and throughholes may be in the current collector plate and the lower insulation plate to cut off a charging current path when the membrane is inverted from the pressure of the gases being transmitted to the terminal cavity, the gases are generated when the secondary battery is overcharged. A fuse may be at a lower end of the membrane, and the fuse may be connected to the current collector plate. When the secondary battery is externally shorted-circuited, the fuse may be melted by a short-circuit current to cut off a short-circuit current path.

As described above, various examples of the present disclosure provide a secondary battery having a positive electrode terminal-and-membrane integrated cap plate.

In some examples, the present disclosure provide a secondary battery having a positive electrode terminal-and-membrane integrated cap plate, which can cut off a charging current in an overcharge mode by integrating a positive electrode terminal and a membrane into the cap plate. For example, when the secondary battery is overcharged, gases may be generated due to decomposition of active materials and an electrolyte, and the internal pressure of the secondary battery may rise. The membrane connected to the current collector plate may be inverted by the gas pressure, thereby cutting off the charging current.

In addition, various examples provide a secondary battery having a positive electrode terminal-and-membrane integrated cap plate, which can cut off a short-circuit current in an external short-circuit mode by placing a fuse in a region of the membrane connected to the current collector plate. For example, when the secondary battery is pierced by a conductor, crushed and/or externally short-circuited due to short-circuits occurring between the positive electrode terminal and the negative electrode terminal, the short-circuit current (overcurrent) may flow in the secondary battery. In such an event, a fuse connecting the membrane and the current collector plate is melted and removed, thereby cutting off the short-circuit current (overcurrent).

BRIEF DESCRIPTION OF THE DRAWINGS

FIGS. 5A and 5B show schematic views illustrating states before and after operations in an external short-circuit mode in an example secondary battery;

FIG. 6 shows a partial cross-sectional view of an example secondary battery having a positive electrode terminal-and-membrane integrated cap plate;

DETAILED DESCRIPTION

Figure 1:
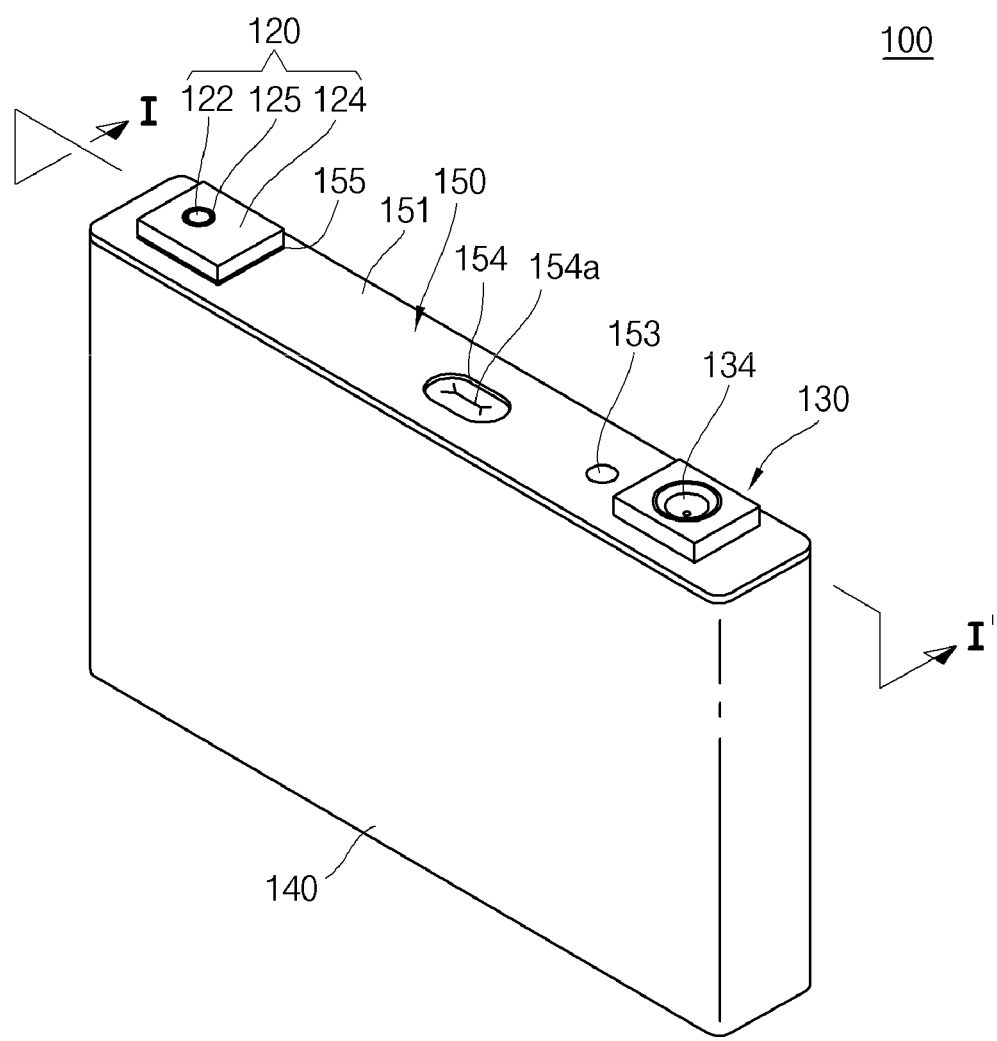
FIG. 1 shows a perspective view of an example secondary battery having a positive electrode terminal-and-membrane integrated cap plate.

Hereinafter, an example embodiment of the present disclosure will be described in detail.

Various examples of the present disclosure may be embodied in many different forms and may not be construed as being limited to the example set forth herein. Rather, these examples of the disclosure are provided so that this disclosure will be thorough and complete and will convey inventive concepts of the disclosure to those skilled in the art.

In addition, in the accompanying drawings, sizes or thicknesses of various components are exaggerated for brevity and clarity. Like numbers refer to like elements throughout. In addition, it will be understood that when an element A is referred to as being "connected to" an element B, the element A can be directly connected to the element B or an intervening element C may be present and the element A and the element B are indirectly connected to each other.

The terminology used herein is for the purpose of describing particular example only and is not intended to be limiting of the disclosure. As used herein, the singular forms are intended to include the plural forms as well, unless the context clearly indicates otherwise. It will be further understood that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "beneath," "below," "lower," "downward," "above," "upper," "upward," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. Further, the use of "may" when describing embodiments of the inventive concept refers to "one or more embodiments of the inventive concept." Also, the term "exemplary" is intended to refer to an example or illustration.

As used herein, the term "substantially," "about," and similar terms are used as terms of approximation and not as terms of degree, and are intended to account for the inherent deviations in measured or calculated values that would be recognized by those of ordinary skill in the art.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

In addition, the expression "positive electrode terminal-and-membrane integrated cap plate" described in the specification of the present disclosure refers to a cap plate in the shape of a rectangular flat panel with a positive electrode terminal and a membrane, which are integrated into the cap plate through multiple forging processes. In the drawings, thicknesses or widths of the positive electrode terminal, the membrane and the cap plate may be exaggerated for clarity, and illustration of some portions is omitted to avoid obscuring the subject matter of the present disclosure. For example, although a short-circuit plate and a fuse may be provided in a negative electrode terminal and a current collector plate, respectively, they are not illustrated because they do not come under the subject matter of the present disclosure. In the specification of the present disclosure, in some cases, the negative electrode terminal may also be referred to as a first terminal and the positive electrode terminal may also be referred to as a second terminal or terminal portion.

Figure 2A:
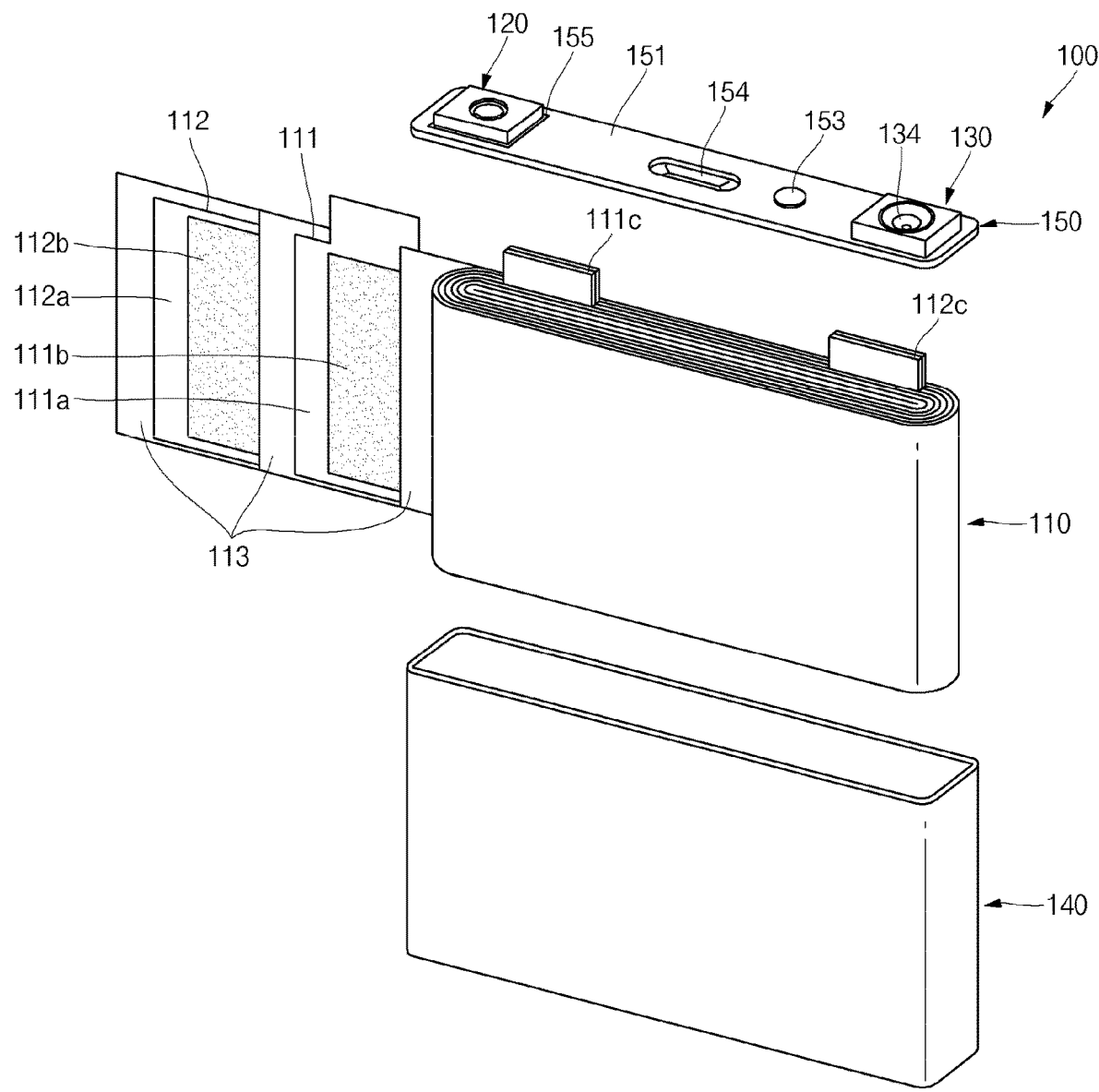
FIGS. 2A and 2B respectively show an exploded perspective view of the secondary battery of FIG. 1 having a positive electrode terminal-and-membrane integrated cap plate, and a cross-sectional view taken along the line I-I' of FIG. 1.
Figure 2B:
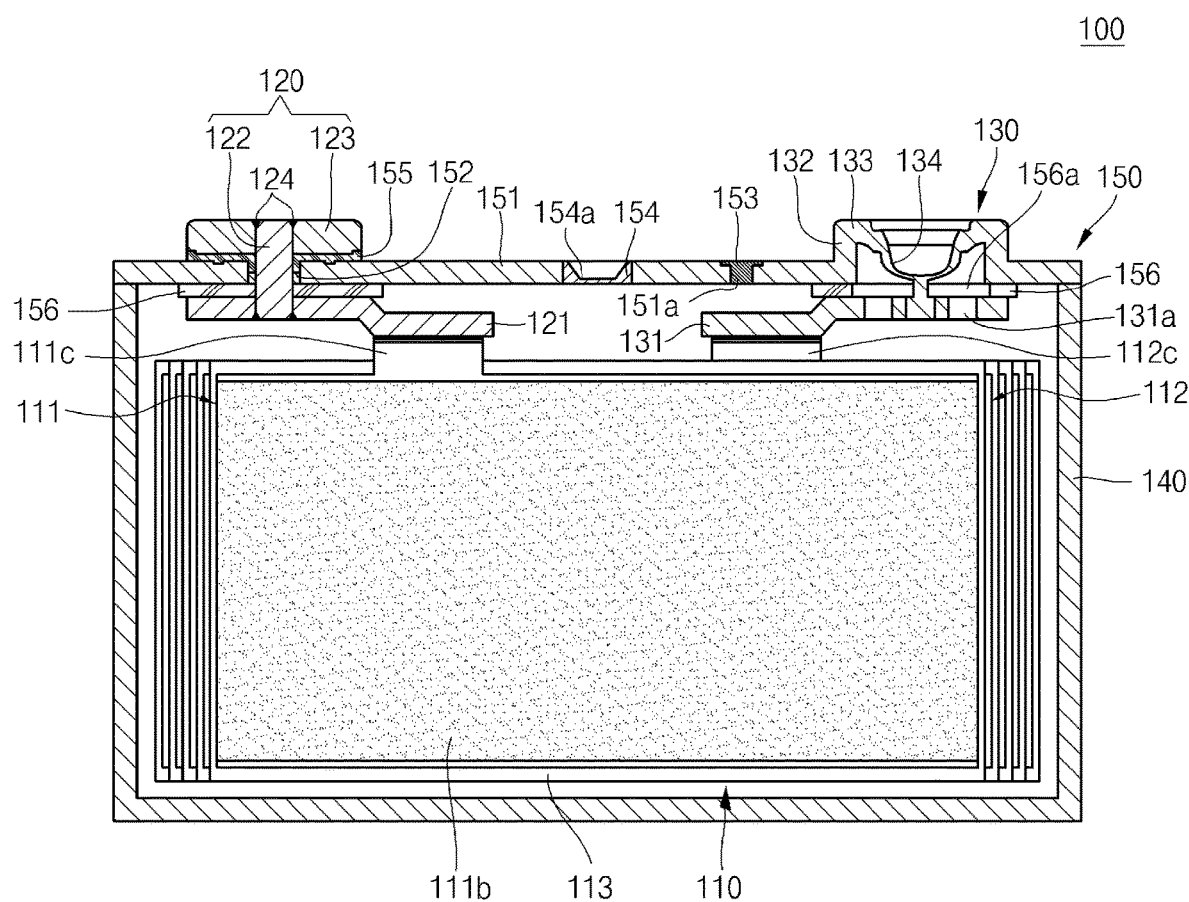

FIG. 1 shows a perspective view of an example secondary battery 100 having a positive electrode terminal-and-membrane integrated cap plate. FIGS. 2A and 2B, respectively, show an exploded perspective view of the example secondary battery 100 having a positive electrode terminal-and-membrane integrated cap plate 151, and a cross-sectional view taken along the line of FIG. 1.

As illustrated in FIGS. 1, 2A, and 2B, the secondary battery 100 according to an example of the present disclosure may include an electrode assembly 110, a first terminal 120, a second terminal 130, a case 140 and a cap assembly 150.

The electrode assembly 110 may be formed by winding or laminating a stacked structure including a first electrode plate 111, a separator 113, and a second electrode plate 112, which are formed of thin plates or layers. Here, the first electrode plate 111 may serve as a negative electrode and the second electrode plate 112 may serve as a positive electrode, and vice versa.

The first electrode plate 111 may be formed by coating a first electrode active material 111*b* including graphite or carbon on a first electrode current collector 111*a* formed as a metal foil made of copper, a copper alloy, nickel, or a nickel alloy, and include a first electrode uncoated portion that is a region without the first electrode active material 111b coated thereon. In addition, the first electrode plate 111 may include a first multi-tab 111c upwardly extending a set or predetermined length from the first electrode uncoated portion. The first multi-tab 111c becomes a passageway of the flow of current between the first electrode plate 111 and the outside of the first electrode plate 111. Here, the present disclosure does not limit the material of the first electrode plate 111 to those listed herein. In addition, the multi-tab used herein may encompass the concept of multiple tabs, but aspects of the present disclosure are not limited thereto. The multi-tab used herein may also encompass the concept of a single tab.

The second electrode plate 112 may be formed by coating a second electrode active material 112b including a transition metal oxide on a second electrode current collector 112a formed as a metal foil made of aluminum or an aluminum alloy, and may include a second electrode uncoated portion that is a region without the second electrode active material 112b coated thereon. In addition, the second electrode plate 112 may include a second multi-tab 112c upwardly extending a set or predetermined length from the second electrode uncoated portion. The second multi-tab 112c may be a passageway of the flow of current between the second electrode plate 112 and the outside of the second electrode plate 112 (e.g., the second current collector plate 131). Here, the first and second multi-tabs 111c and 112c maintain a substantially parallel state with respect to each other. The present disclosure does not limit the material of the second electrode plate 112 to those listed herein.

Polarities of the first electrode plate 111 and the second electrode plate 112 may change, and the first electrode plate 111 and the second electrode plate 112 may then be suitably arranged.

Here, a winding axis of the electrode assembly 110 may be substantially parallel or substantially horizontal with respect to the terminal axes of the first terminal 120 and the second terminal 130. Here, the winding axis and the terminal axes may refer to axes in upward and downward directions in FIGS. 2A and 2B. In addition, it means that when the winding axis and the terminal axes are referred to as being "substantially parallel or arranged substantially horizontal with respect to each other", they may not meet each other even by stretching them a suitably long distance or they may still eventually meet each other by stretching them along an extremely long distance.

The separator 113 may be disposed between the first electrode plate 111 and the second electrode plate 112 to avoid short-circuiting and allow movement of lithium ions. The separator 113 may be formed of polyethylene, polypropylene, or a composite film including polyethylene and polypropylene. The present disclosure does not limit the material of the separator 113 to those listed herein.

A first terminal 120 and a second terminal 130 are electrically connected to the first electrode plate 111 and the second electrode plate 112, and are positioned at left and right sides of an upper portion of the electrode assembly 110, respectively.

The electrode assembly 110 is housed in the case 140 together with the electrolyte. The electrolyte may include an organic solvent, such as EC, PC, DEC, EMC, or DMC, and a lithium salt, such as $LiPF_6$ or $LiBF_4$. In addition, the electrolyte may be in a liquid, solid or gel phase.

The first terminal 120 may be formed of a metal and may be electrically connected to the first electrode plate 111. The first terminal 120 may include a first current collector plate 121, a first terminal pillar 122 and a first terminal plate 123. Here, the first terminal pillar 122 is electrically/mechanically connected between the first current collector plate 121 and the first terminal plate 123.

The first current collector plate 121 contacts the first multi-tab 111c protruding from one side (e.g., the left) of the upper portion of the electrode assembly 110. For example, the first current collector plate 121 is welded to the first multi-tab 111c. In addition, the first current collector plate 121 may include a hole formed at one side, and the first terminal pillar 122 is fitted into the hole for riveting or welding. The first current collector plate 121 may be formed of, for example, copper or a copper alloy. However, the present disclosure does not limit the material of the first current collector plate 121 to those listed herein.

The first terminal pillar 122 upwardly protrudes and extends a set or predetermined length from the cap plate 151 while passing through the cap plate 151, which will later be described. The terminal pillar 122 may be electrically connected to the first current collector plate 121 at a lower portion of the cap plate 151. Here, the first terminal pillar 122 is electrically insulated from the cap plate 151.

The first terminal pillar 122 may pass through the cap plate 151 and may be formed of, for example, copper, a copper alloy, nickel, a nickel alloy, aluminum or an aluminum alloy.

The first terminal plate 123 may have at least one hole, and the first terminal pillar 122 may be coupled and welded to the hole. Here, the first terminal plate 123 may be formed of, for example, aluminum or an aluminum alloy. In some configurations, laser beam may be provided to boundary regions of the first terminal pillar 122 and the first terminal plate 123, which are upwardly exposed, so that the boundary regions are melted and then cooled to be welded to each other. Regions resulting after the welding are denoted by reference numeral 124.

As described above, since the first terminal plate 123 may be formed of aluminum or an aluminum alloy, busbars formed of aluminum or an aluminum alloy may be easily welded.

The second terminal 130 may also be formed of a metal and may be electrically connected to the second electrode plate 112. For example, the second terminal 130 may be integrated into the cap plate 151, and may be formed of the same material as the cap plate 151. The second terminal 130 may include a second current collector plate 131, a support region 132, a terminal region 133, and a membrane 134. Here, the support region 132, the terminal region 133, and the membrane 134, may be formed by a forging process at the time of forming the cap plate 151.

The second current collector plate 131 may contact the second multi-tab 112c protruding from one side (e.g., the right) of the upper portion of the electrode assembly 110. For example, the second current collector plate 131 may be welded to the second multi-tab 112c. The second current collector plate 131 may include a hole formed thereat, and the membrane 134 concavely located downwardly at the terminal region 133, may be connected to the hole. In some examples, a protrusion may be at a lower end of the membrane 134, and may be coupled to the hole of the second current collector plate 131. The protrusion may be coupled to the second current collector plate 131, followed by riveting or welding. The second current collector plate 131 may be formed of, for example, aluminum or an aluminum alloy. However, the present disclosure does not limit the material of the second current collector plate 131 to those listed herein.

The support region 132 may upwardly extend a set or predetermined length from the cap plate 151, and the terminal region 133 may be at a top end of the support region 132. The terminal region 133 may have the same height or thickness as the first terminal plate 123, and may have an outer shape similar to that of the first terminal plate 123. In addition, since the terminal region 133 may be also formed of aluminum or an aluminum alloy, busbars made of aluminum or an aluminum alloy may be easily welded. Here, since the terminal region 133 may be integrated into the cap plate 151, the cap plate 151 and the case 140, which will later be described, may have the same polarity as the second terminal 130 (e.g., a positive polarity). Accordingly, the second terminal 130 may serve as a positive electrode terminal.

The case 140 may be made of a conductive metal, such as aluminum, an aluminum alloy or nickel plated steel, and may have an approximately hexahedron shape provided with an opening through which the electrode assembly 110 is inserted and placed. Since the case 140 and the cap assembly 150 are illustrated in an assembled state in FIGS. 2A-2B, the opening of the case 140 is not shown. However, it will be appreciated that the opening corresponds to a substantially open portion of the edge of the cap assembly 150. Here, the inner surface of the case 140 may be treated to be insulated from the electrode assembly 110, the first terminal 120, the second terminal 130, and the cap assembly 150.

The cap assembly 150 may be coupled to the case 140. In particular, the cap assembly 150 may include the cap plate 151, a seal gasket 152, a plug 153, a safety vent 154, an upper insulation member 155, and a lower insulation member 156.

The cap plate 151 closes the opening of the case 140 and may be made of the same material as the case 140. For example, the cap plate 151 may be coupled to the case 140 by laser welding. As described above, since the cap plate 151 may have the same polarity with the second terminal 130, the cap plate 151 and the case 140 may also have the same polarity. Also, since the second terminal 130 and the membrane 134 are integrated into the cap plate 151, they may be considered as one single element of the cap plate 151.

The seal gasket 152 may be made of an insulating material, and may be located between the first terminal pillar 122 and the cap plate 151. The seal gasket 152 may prevent or protect from the introduction of external moisture into the secondary battery 100 or the leakage of the electrolyte from the secondary battery 100.

The plug 153 may close an electrolyte injection hole 151*a* of the cap plate 151. The safety vent 154 may be installed in a vent hole of the cap plate 151 and may have a notch 154*a* to be opened at a set pressure.

The upper insulation member 155 may be located between the first terminal pillar 122 and the cap plate 151, and between the first terminal plate 123 and the cap plate 151. Moreover, the upper insulation member 155 may make close contact with the seal gasket 152. The upper insulation member 155 may insulates the first terminal pillar 122 and the first terminal plate 123 from the cap plate 151.

The lower insulation member 156 may be between the first current collector plate 121 and the cap plate 151, thereby preventing or protecting from unnecessary short-circuits. In some examples, the lower insulation member 156 prevents or protects from a short-circuit between the first current collector plate 121 and the cap plate 151.

Figure 3:
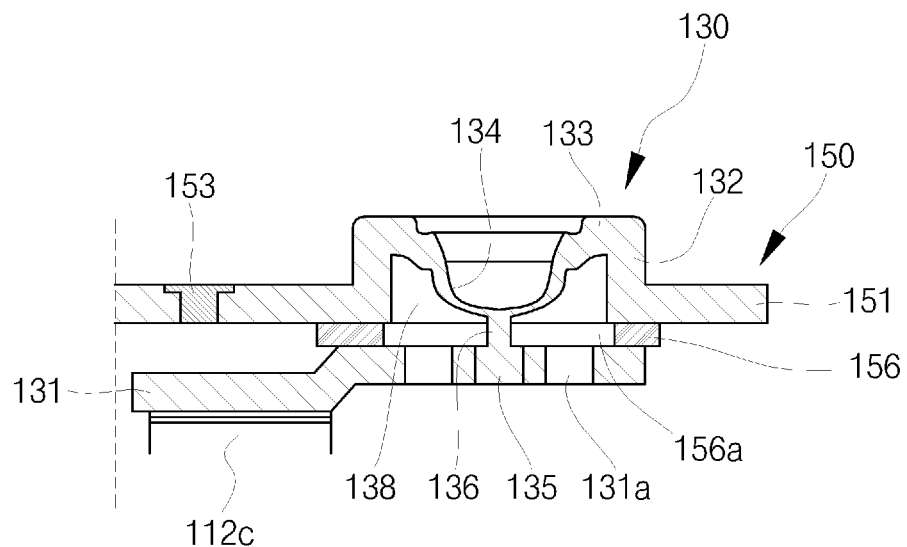
FIG. 3 shows an enlarged cross-sectional view illustrating example parts of the example secondary battery having a positive electrode terminal-and-membrane integrated cap plate.

FIG. 3 shows an enlarged cross-sectional view illustrating essential parts of the example secondary battery having a positive electrode terminal-and-membrane integrated cap plate 151. In the following description, the terminal portion refers to a second terminal or a positive electrode terminal.

As illustrated in FIG. 3, the cap plate 151 may include the terminal portion 130 integrated thereinto, and the membrane 134 integrated into the terminal portion 130. Here, the membrane 134 may be electrically connected to the electrode assembly 110 through the current collector plate 131.

For example, the terminal portion 130 may include the support region 132 substantially upwardly extending a set or predetermined length from the cap plate 151, and the terminal region 133 substantially horizontally extending from the support region 132. In some examples, the support region 132 may be bent and extended in a substantially perpendicular direction with respect to a lengthwise direction of the cap plate 151, and the terminal region 133 may be bent and extended in a substantially horizontal direction with respect to the lengthwise direction of the cap plate 151.

In addition, the membrane 134 may be concavely located substantially downwardly from the terminal region 133. In some examples, the membrane 134 may be configured such that it is downwardly recessed a set or predetermined depth from the center of the terminal region 133. A thickness of the membrane 134 may be smaller than that of the terminal region 133. In addition, the thickness of the membrane 134 may gradually decrease substantially toward the lower end of the membrane 134. In addition, as described above, the membrane 134 may be connected to the electrode assembly 110 through the current collector plate 131, and the lower insulation plate 156 may be interposed between the current collector plate 131 and the cap plate 151. Therefore, the current collector plate 131 may not be directly electrically connected to the cap plate 151 but may be indirectly electrically connected to the cap plate 151 through the membrane 134.

Here, a protrusion 135 may be at the bottommost end of the membrane 134. The protrusion 135 may be coupled to the hole of the current collector plate 131, by riveting and/or welding, thereby allowing the protrusion 135 to be electrically connected to the current collector plate 131. In some examples, the membrane 134 may be electrically connected to the current collector plate 131 through the protrusion 135.

In addition, a terminal cavity 138 having a set or predetermined volume may be defined by the terminal portion 130 (the support region 132 and the terminal region 133) and the membrane 134. Here, at least one throughhole 156*a* may be in the lower insulation plate 156 corresponding to the terminal cavity 138, and at least one throughhole 131*a* may be in the current collector plate 131, so that the terminal cavity 138 and the internal space of the case 140 can be connected to each other. Therefore, when the internal pressure of the case 140 becomes higher than a preset reference pressure, it may be transmitted to the terminal cavity 138 to invert the membrane 134.

Alternatively, a fuse 136 having a relatively small width may be between the membrane 134 and the protrusion 135 or between the membrane 134 and the current collector plate 131. Since the fuse 136 may be designed to have a smaller sectional area than the membrane 134 and/or the protrusion 135, the fuse 136 may be melted and removed when an overcurrent flows through the fuse 136.

Figure 4A:
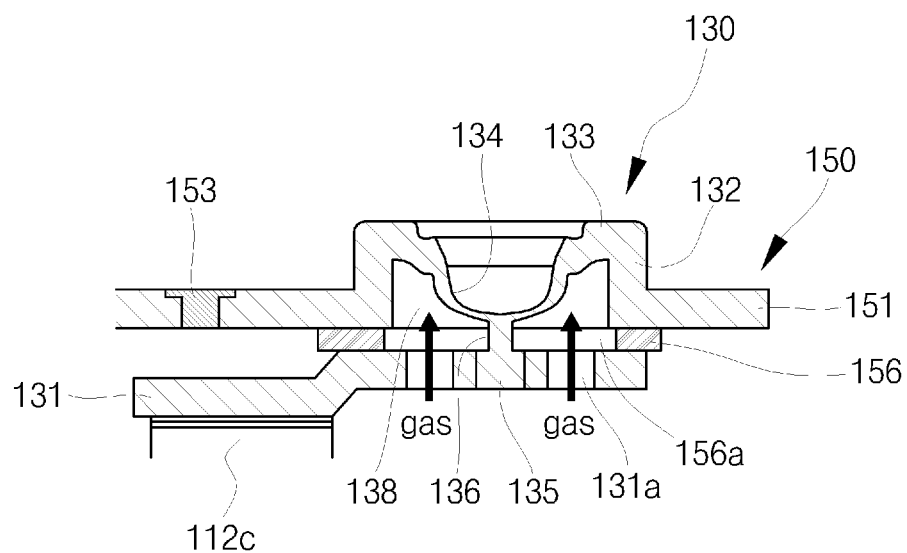
FIGS. 4A and 4B show schematic views illustrating states before and after operations in an overcharge mode in an example secondary battery.
Figure 4B:
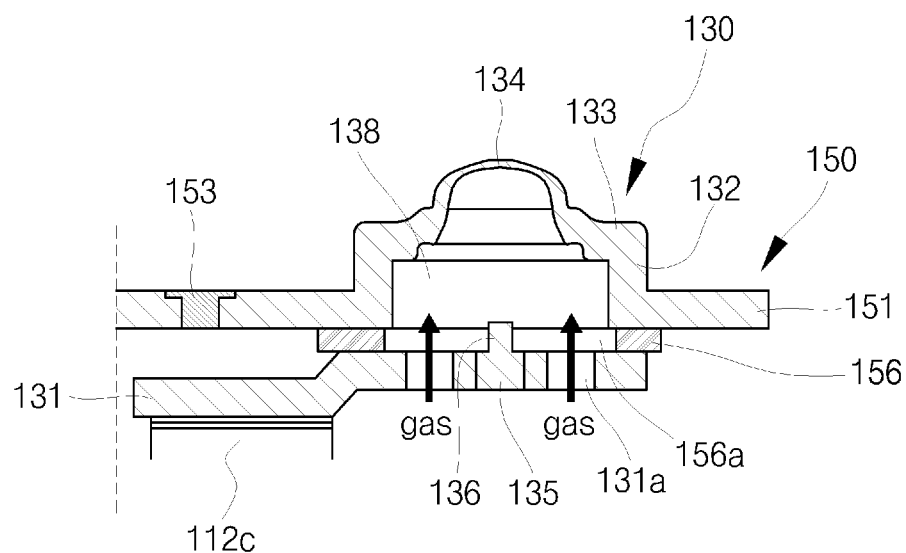

FIGS. 4A and 4B show schematic views illustrating states before and after operations in an overcharge mode in an example secondary battery.

If the secondary battery according to the example of the present disclosure enters an overcharge mode, a large amount of gases are generated due to decomposition of an electrolyte or active materials and the internal pressure sharply increases by the generated gases.

As illustrated in FIGS. 4A and 4B, if gases are generated in a case, the gases are transmitted to the terminal cavity 138 through the throughhole 131a of the current collector plate 131 and the throughhole 156a of the lower insulation plate 156.

Here, when the gas pressure exceeds a preset reference pressure, the membrane 134 is inverted and is electrically disconnected from the current collector plate 131. In some examples, as the membrane 134, the fuse 136 and/or the protrusion 135 are separated from the current collector plate 131, a current path between the current collector plate 131 and the membrane 134 is cut off. Therefore, the charging current is no longer supplied to the secondary battery, thereby preventing or protecting the secondary battery from being overcharged.

Although, FIG. 4B illustrates that the membrane 134 is completely inverted, the present disclosure is not limited thereto. Rather, the membrane 134 may be slightly separated from the current collector plate 131 in an overcharge mode.

Figure 5A:
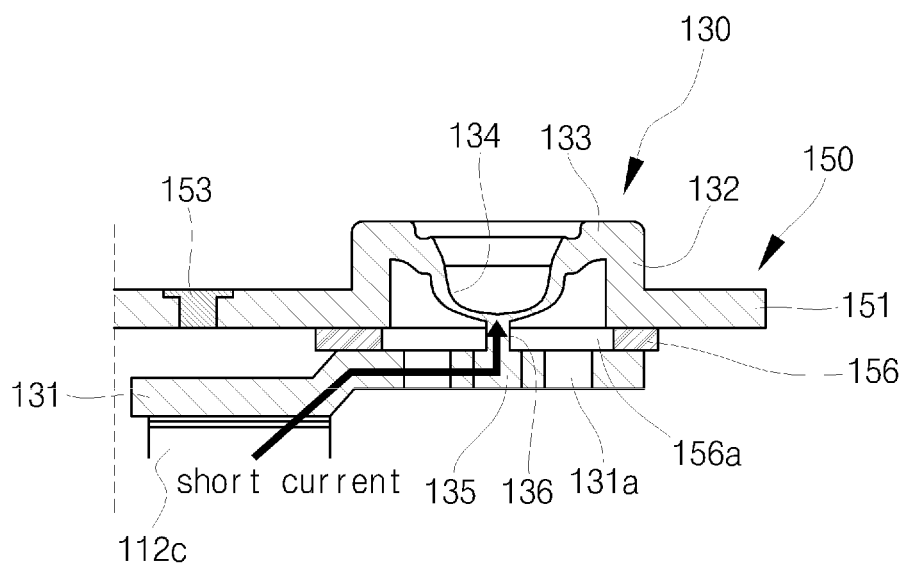

FIGS. 5A and 5B show schematic views illustrating states before and after operations in an external short-circuit mode in an example secondary battery.

If the secondary battery according to the example of the present disclosure enters an external short-circuit mode, a short-circuit current flows to the membrane 134 and the terminal portion 130, through the current collector plate 131. In some examples, when the secondary battery is pierced by a conductor or crushed by a heavy material, or external positive and negative electrode terminals are directly short-circuited, the over-current may flow in the secondary battery through the current collector plate 131, the membrane 134, and the terminal portion 130.

As illustrated in FIGS. 5A and 5B, when the short-circuit current (i.e., the overcurrent) is in a higher level than the reference current, the fuse 136 between the membrane 134 and the current collector plate 131 and/or between the membrane 134 and the protrusion 135, is melted and removed. Accordingly, the short-circuit current (the over-current) between the current collector plate 131 and the membrane 134 is cut off, thereby preventing or protecting the secondary battery from getting into a dangerous state.

FIG. 6 shows a partial cross-sectional view of an example secondary battery having a positive electrode terminal-and-membrane integrated cap plate 151.

As illustrated in FIG. 6, the secondary battery according to the example of the present disclosure may further include a resin portion 137 at the edge of the fuse 136. The resin portion 137 surrounds the edge of the fuse 136 but does not come into contact with a bottom surface of the membrane 134 and the current collector plate 131 or a top surface of the protrusion 135. Therefore, an inverting operation of the membrane 134 is not impeded by the resin portion 137.

However, an arc that may occur during the operation of the fuse 136 may be suppressed by the resin portion 137, thereby preventing or reducing the risk of a fire or explosion from occurring at the secondary battery due to the arc.

Figure 7:
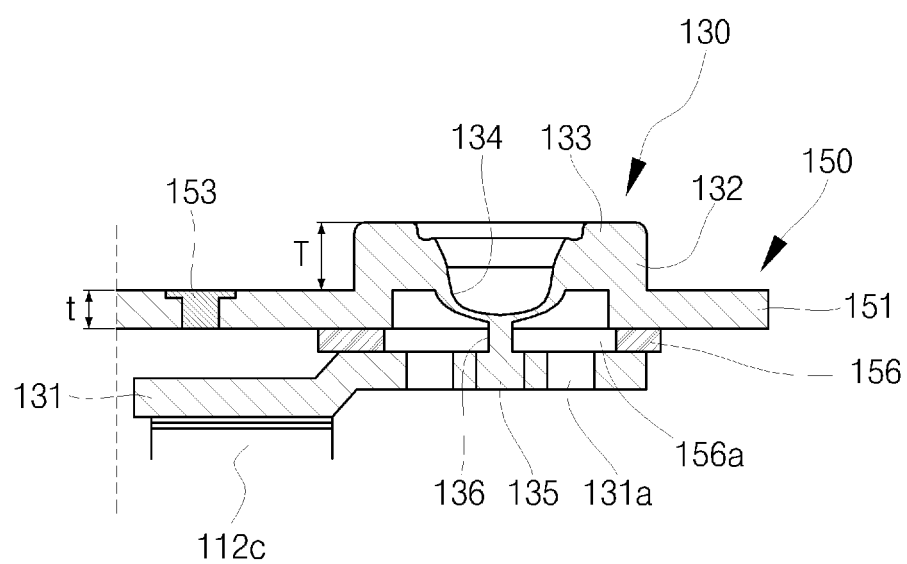
FIG. 7 shows a partial cross-sectional view of an example secondary battery having a positive electrode terminal-and-membrane integrated cap plate.

FIG. 7 show a partial cross-sectional view of an example secondary battery having a positive electrode terminal-and-membrane integrated cap plate 151.

As illustrated in FIG. 7, in the secondary battery according to the example of the present disclosure, a thickness of the terminal portion 130, specifically a thickness (T) of the terminal region 133 may be greater than a thickness (t) of the cap plate 151. For example, the thickness (T) of the terminal region 133 may be 1.5 to 3 times greater than the thickness (t) of the cap plate 151, but aspects of the present disclosure are not limited thereto.

In some configurations, busbars may be welded to the terminal region 133 of the terminal portion 130 using laser beam. Here, integrated welding regions are formed in the busbars and the terminal portion 130 by the laser beam. If depths of the welding regions are greater than the thickness of the terminal region 133, throughholes may be formed in the terminal region 133, and a welding failure may occur due to the throughholes. In the example of the present disclosure, however, the thickness of the terminal region 133 of the positive electrode terminal may be greater than the thickness of the cap plate 151, and the depths of the welding regions formed in the terminal region 133 during laser welding may be smaller than the thickness of the terminal region 133. Therefore, the busbars can be welded to the terminal region 133 of the terminal portion 130 without a welding failure.

Figure 8:
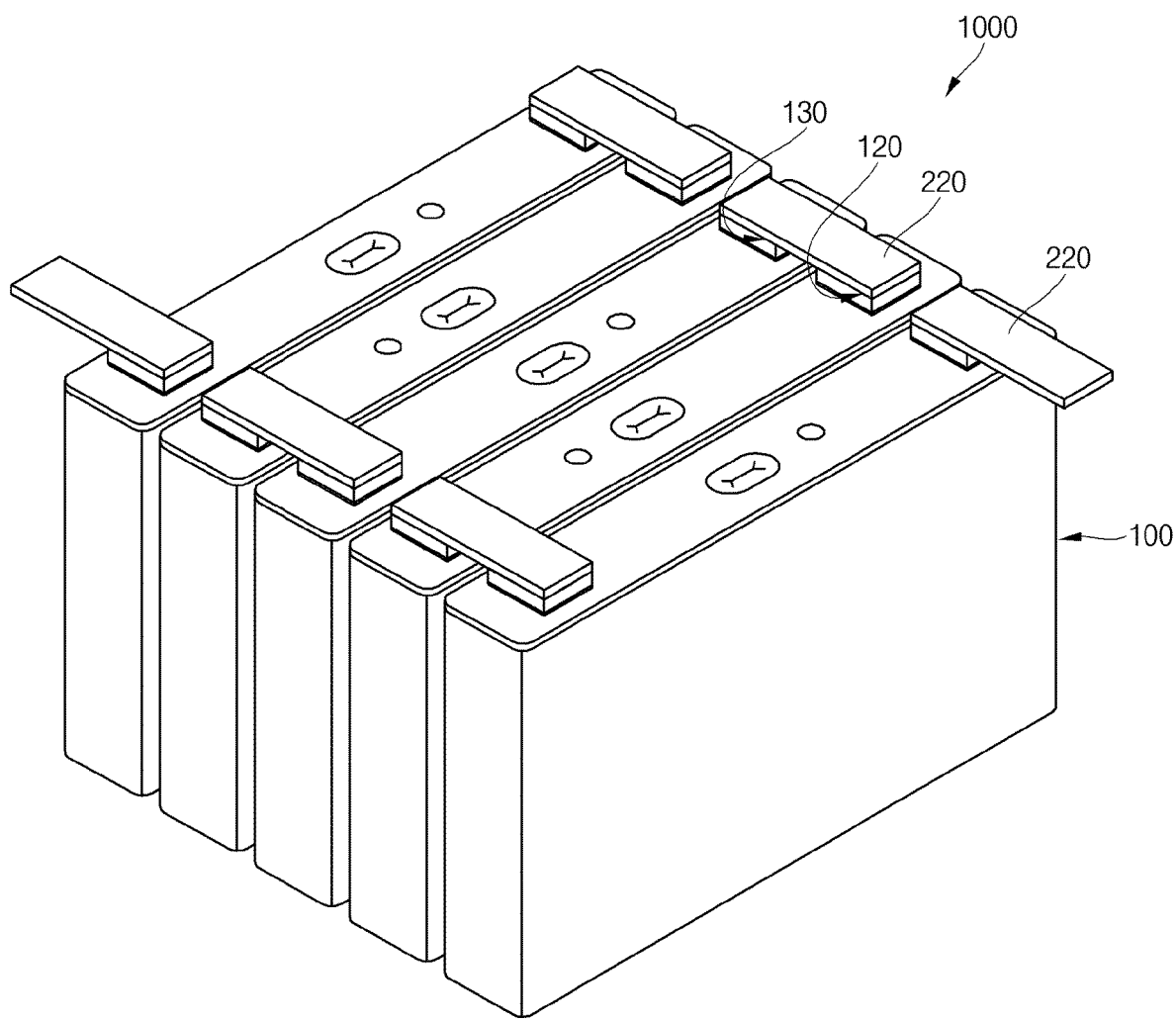
FIG. 8 shows a perspective view illustrating an example battery module using the secondary battery.

FIG. 8 shows a perspective view illustrating an example battery module 1000 using the secondary battery.

As illustrated in FIG. 8, a plurality of secondary batteries 100 may be arranged in a line and a plurality of busbars 220 may be coupled to the plurality of secondary batteries 100, thereby completing a battery module 1000. For example, a first terminal (e.g., a negative electrode terminal) of one of the plurality of secondary batteries 100 may be welded to a secondary terminal (e.g., a positive electrode terminal) 130 of another of the plurality of secondary batteries 100, which is adjacent to the one secondary battery 100 by the busbars 220, thereby providing the battery module 1000 having the plurality of secondary batteries 100 connected to one another in series. Here, the busbars 220 may be made of aluminum or an aluminum alloy. The first terminal plate 124 of the first terminal 120 and the terminal region 133 of the second terminal 130 may also be made of aluminum or an aluminum alloy. Therefore, the busbars 220 can be welded to the first terminal 120 and the second terminal 130.

Here, the positive electrode terminal-and-membrane integrated cap plate according to the example of the present disclosure may be made of aluminum or an aluminum alloy. In some examples, the positive electrode terminal-and-membrane integrated cap plate according to the example of the present disclosure may be formed using one selected from the group consisting of 1XXX series alloys (e.g., 1050, 1060, 1100, 1145, 1199, 1200, 1230, 1350, etc.), that is, pure aluminum of 99.0% or greater purity, 2XXX series alloys (e.g., 2011, 2014, 2017, 2018, 2124, 2219, 2319, 201.0, 203.0, 206.0, 224.0, 242.0, etc.), that is, Al—Cu alloys, 3XXX series alloys (e.g., 3003, 3004, 3102, 3105, 383.0, 385.0, A360, 390.0, etc.), that is, Al—Mn alloys, 4XXX series alloys (e.g., 4032, 4043, 4145, 4643, etc.), that is, Al—Si alloys, 5XXX series alloys (e.g., 5005, 5052, 5083, 5086, etc.), that is, Al—Mg alloys, 6XXX series alloys (e.g., 6061, 6063, etc.), that is, Al—Mg—Si alloys, 7XXX series alloys (e.g., 7075, 7050, 7049, 710.0, 711.0, etc.), that is, Al—Zn—(Mg,Cu) alloys, and 8XXX series alloys (e.g., 8006, 8111, 8079, 850.0, 851.0, 852.0), that is, Al+Other Elements (e.g., iron, nickel, lithium, etc.), except for the elements used in 7XXX or 2XXX series alloys.

In some examples, the positive electrode terminal-and-membrane integrated cap plate according to the present disclosure can be made of pure aluminum, which is a 1XXX series alloy having excellent corrosion resistance, superb electrical and thermal conductivities, and good weldability and workability, or non-heat treatable alloys, which are 3XXX series alloys having various properties acquired by a cooling process with manganese as a principle alloying element, including a higher strength than pure aluminum, good weldability, corrosion resistance and workability.

In the positive electrode terminal-and-membrane integrated cap plate according to the example of the present disclosure, since the terminal region and/or the membrane may be formed through various forging processes, as described above, the 1XXX series alloy or the 3XXX series alloys may be used.

The positive electrode terminal-and-membrane integrated cap plate according to the example of the present disclosure may be made of aluminum 1050 series alloys including, for example, aluminum: 99.5% min, copper: 0.05% max, iron: 0.4% max, magnesium: 0.05% max, manganese: 0.05% max, silicon: 0.25% max, titanium: 0.03% max, vanadium: 0.05% max, and zinc: 0.05% max, but are not limited thereto. Additionally, aluminum 1060, 1100, or 1199 series alloys may also be used.

In addition, the positive electrode terminal-and-membrane integrated cap plate according to the example of the present disclosure may be made of aluminum 3003 series alloys including, for example, aluminum: 96.8 to 99%, copper: 0.05 to 0.20%, iron: 0.70% max, manganese: 1.0 to 1.5%, silicon: 0.6% max, zinc: 0.1% max, and residuals: 0.15% max. Additionally, aluminum 3004 or 3102 series alloys may also be used.

Figure 9A:
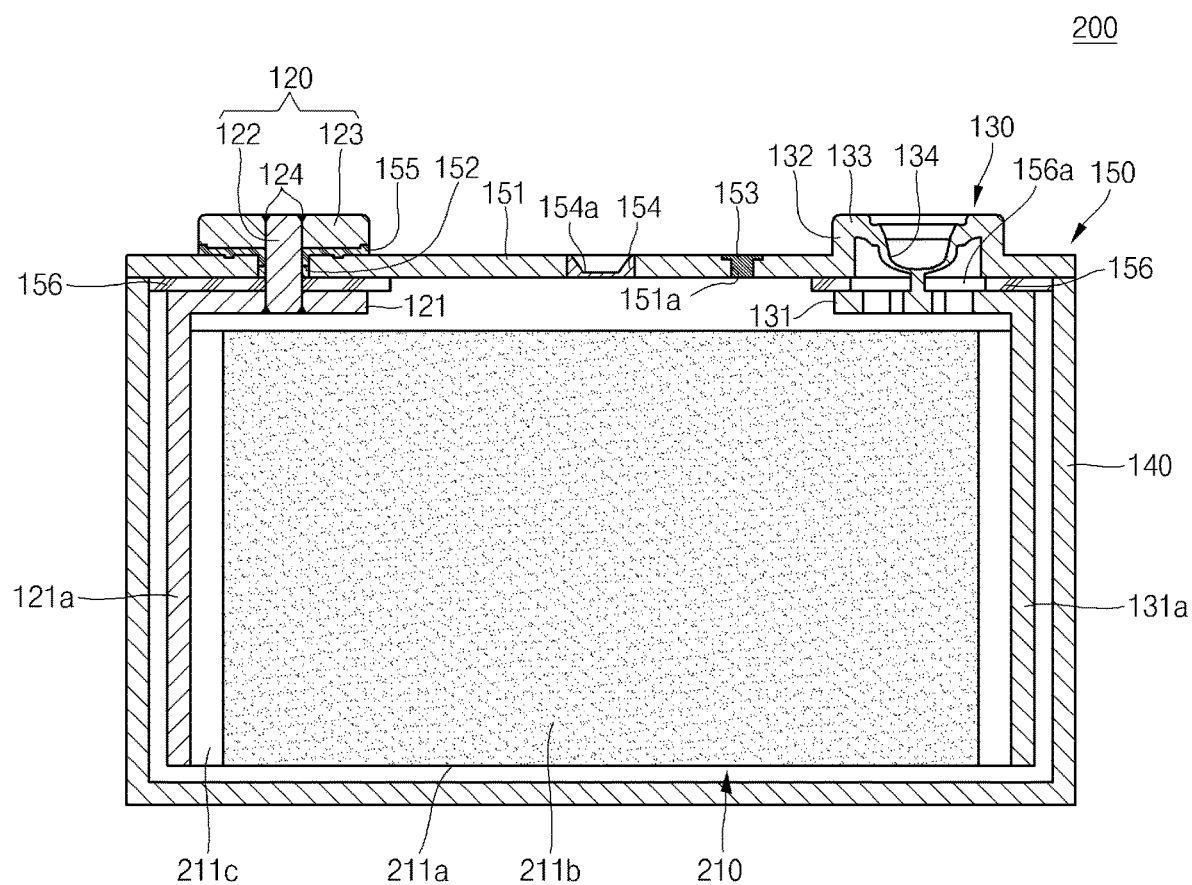
FIGS. 9A and 9B respectively show a cross-sectional view of an example secondary battery having a positive electrode terminal-and-membrane integrated cap plate, and a perspective view illustrating an example electrode assembly.
Figure 9B:
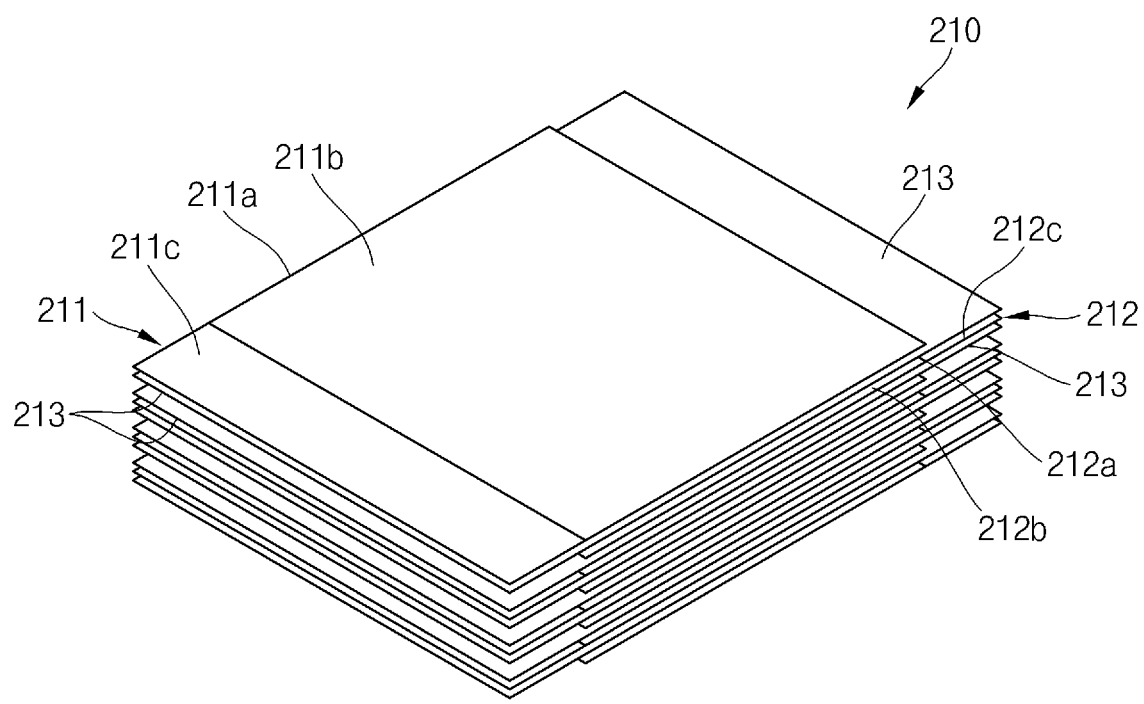

FIGS. 9A and 9B, respectively, show a cross-sectional view of an example secondary battery 200 having a positive electrode terminal-and-membrane integrated cap plate, and a perspective view illustrating an example electrode assembly 210.

As illustrated in FIGS. 9A and 9B, the secondary battery 200 having a positive electrode terminal-and-membrane integrated cap plate according to the present disclosure may include an electrode assembly 210, a first terminal 120, a second terminal 130, a case 140, and a cap assembly 150.

The electrode assembly 210 may include, for example, a stack type electrode assembly or a winding type electrode assembly, but is not limited thereto. The stack type electrode assembly 210 may include a first electrode plate 211, a separator 213, and a second electrode plate 212, and may be provided by sequentially stacking these components in that order.

The first electrode plate 211 may include a first electrode current collector 211a having a panel shape, a first electrode active material 211b coated on both surfaces or one surface of the first electrode current collector 211a, and a first electrode uncoated portion 211c at one side of the first electrode current collector 211a without the first electrode active material 211b coated thereon.

The first electrode uncoated portion 211c of the first electrode plate 211 may be connected to a first bent portion 121a, bent approximately at right angle from a first current collector plate 121 of the first terminal 120. In an example, a lengthwise direction of the first bent portion 121a may be substantially parallel with a lengthwise direction of a first terminal pillar 122, and the first electrode uncoated portion 211c facing the first bent portion 121a may be welded to the first bent portion 121a through laser welding and/or ultrasonic welding.

The second electrode plate 212 may include a second electrode current collector 212a having a panel shape, a second electrode active material 212b coated on both surfaces or one surface of the second electrode current collector 212a, and a second electrode uncoated portion 212c at one side of the second electrode current collector 212a without the second electrode active material 212b coated thereon.

The second electrode uncoated portion 212c of the second electrode plate 212 may be connected to a second bent portion 131a bent approximately at right angle from a second current collector plate 131 of the second terminal 130. In an example embodiment, a lengthwise direction of the second bent portion 131a may be substantially parallel with a lengthwise direction of a fuse 136, and the second electrode uncoated portion 212c facing the second bent portion 131a may be welded to the second bent portion 131a through laser welding or ultrasonic welding.

In this way, the current may be supplied from the electrode assembly 210 to the first terminal 120 and the second terminal 130 positioned on the electrode assembly 210 through the first bent portion 121a and the second bent portion 131a disposed at the left and right sides of the electrode assembly 210. Conversely, the current may be supplied from the first terminal 120 and the second terminal 130 to the electrode assembly 210 through the first bent portion 121a and the second bent portion 131a, the first bent portion 121a and the second bent portion 131a being disposed at the left and right sides of a lower portion of the electrode assembly 210.

In some configurations, regions excluding the first electrode uncoated portion 211c and the second electrode uncoated portion 212c in the electrode assembly 210 may be subjected to insulation treatment by being surrounded by a separator or a separate insulation member. In addition, although only the stack type electrode assembly is illustrated in FIGS. 9A and 9B, a winding type electrode assemblies may also be used in the present disclosure. In the winding type electrode assembly, like in the stack type electrode assembly, a first electrode uncoated portion may be electrically connected to a first bent portion of a first current collector plate and a second electrode uncoated portion may be electrically connected to a second bent portion of a second current collector plate.

While the secondary battery having a positive electrode terminal-and-membrane integrated cap plate of the present disclosure has been particularly shown and described with reference to example thereof, it will be understood by those of ordinary skill in the art that various changes in form and details may be made therein without departing from the spirit and scope of the present disclosure as defined by the following claims, and equivalents thereof.

What is claimed is:

1. A secondary battery comprising:
a case having an opening;
an electrode assembly housed in the opening of the case; and
a cap plate covering the opening of the case,
wherein the cap plate comprises a terminal portion integrated into the cap plate, wherein a membrane is integrated into the terminal portion, wherein the membrane is electrically connected to the electrode assembly and the cap plate, wherein the membrane decreases in thickness toward a lower end of the membrane, and wherein the cap plate is configured to be electrically connected to a current collector plate of the secondary battery through the membrane.

2. The secondary battery of claim 1, wherein the terminal portion comprises a support region upwardly extending from the cap plate and a terminal region horizontally extending from the support region, wherein the membrane is concavely located downwardly from the terminal region.

3. The secondary battery of claim 2, wherein a thickness of the membrane is less than a thickness (T) of the terminal region.

4. The secondary battery of claim 3, wherein the thickness (T) of the terminal region is greater than a thickness (t) of the cap plate.

5. The secondary battery of claim 4, wherein the thickness (T) of the terminal region is about 1.5 to about 3 times greater than the thickness (t) of the cap plate.

6. The secondary battery of claim 2, wherein the membrane is connected to the electrode assembly through the current collector plate.

7. The secondary battery of claim 6, wherein a lower insulation plate is interposed between the cap plate and the current collector plate.

8. The secondary battery of claim 7, wherein a terminal cavity is defined by the terminal portion and the membrane, wherein one or more throughholes are in the current collector plate and the lower insulation plate to cut off a charging current path when the membrane is inverted from pressure of gases being transmitted to the terminal cavity, the gases being generated when the secondary battery is overcharged.

9. The secondary battery of claim 8, wherein a fuse is at a lower end of the membrane, the fuse being connected to the current collector plate.

10. The secondary battery of claim 9, wherein when the secondary battery is externally shorted-circuited, the fuse is melted by a short-circuit current to cut off a short-circuit current path.

11. The secondary battery of claim 9, further comprising a resin portion surrounding the fuse to suppress an arc during an operation of the fuse to protect the secondary battery.

12. The secondary battery of claim 6, wherein the membrane comprises a protrusion at a bottom end of the membrane, the membrane being electrically connected to the current collector plate through the protrusion.

* * * * *